United States Patent [19]
Roselius et al.

[11] 3,770,456
[45] Nov. 6, 1973

[54] PROCESS FOR THE REMOVAL OF UNDESIRABLE IRRITANTS FROM RAW COFFEE BEANS

[75] Inventors: Wilhelm Roselius, Bremen-St. Magnus; Otto Vitzthum, Bremen; Peter Hubert, Bremen-Lesum, all of Germany

[73] Assignee: HAG Aktiengesellschaft, Bremen, Germany

[22] Filed: Oct. 6, 1971

[21] Appl. No.: 187,168

[52] U.S. Cl. .................................. 426/354, 99/71
[51] Int. Cl. .............................................. A23f 1/04
[58] Field of Search............................ 99/65, 71, 70

[56] References Cited
UNITED STATES PATENTS

| | | | |
|---|---|---|---|
| 3,100,151 | 8/1963 | Breivik et al. | 99/71 |
| 3,181,952 | 5/1965 | Mastrangelo | 99/71 |
| 3,155,523 | 11/1964 | Reich | 99/71 |
| 2,929,716 | 3/1960 | Barch et al. | 99/71 |
| 2,472,881 | 6/1949 | Bender | 99/70 |

Primary Examiner—Frank W. Lutter
Assistant Examiner—William L. Mentlik
Attorney—Henry T. Burke et al.

[57] ABSTRACT

Process for the removal of undesirable irritants from raw coffee beans without concommitant reduction in caffeine content by extraction with organic solvents which comprises extracting the raw beans with a water-immiscible, low boiling organic solvent for a period of from about 0.75 to 4 hours at a temperature which is above the boiling point of the solvent but no higher than about 80° C.

8 Claims, No Drawings

PROCESS FOR THE REMOVAL OF UNDESIRABLE IRRITANTS FROM RAW COFFEE BEANS

BACKGROUND OF INVENTION

A number of ingredients in raw coffee beans other than caffeine are known to have undesirable physiological effects especially in the gastro-intestinal tract. These irritants are primarily lipophilic substances and are found in the coffee oil or wax. They are partially incorporated in the coffee beverage when it is prepared in the conventional manner; see W. Kiekebusch a.o., Arzneimittelforschung (Medicine Research) vol. 14 (1964), page 1,249; G. Czok a.o., Arzneimittelforschung, vol. 12 (1962), page 1,195; U. Harms a.o., Zeitschrift fuer Lebensmitteluntersuchung und -forschung (Journal for Food Examination and Research) vol. 138 (1968), page 75; U. Harms a.o., Kaffee- und Tee-Markt (Coffee and Tea Market) vol. 19 (1969), No. 6, pages 6 to 9, No. 7, pages 6 to 9).

Various methods have been proposed for the removal of these substances, for example, by treating roasted coffee beans with liquid carbon dioxide under pressure (Bach method) or by treating unroasted coffee beans with steam (Lendrich method, as described in German Pat. No. 576,515). These methods are not satisfactory for removing these lipophilic waxy substances.

THE INVENTION

It has now been discovered that these undesirable irritants, especially carboxylic acid-5-hydroxy tryptamides, can be removed without concomitant reduction of the caffeine content by a process which comprises extracting the raw beans under autogenous pressure with a water immiscible, low boiling organic solvent for a period of from about 0.75 to 4 hours at a temperature which is above the boiling point of the solvent under atmospheric pressure, but no higher than about 80° C.

The raw beans are beans which have been previously untreated with water or water vapor.

The extraction solvent is removed from the coffee beans by decantation or drawing off and the solvent residues can be removed by steaming. Surprisingly, the coffee beans after drying and roasting are substantially undistinguishable in either appearance or taste.

The raw coffee beans are extracted under autogenous pressure for from about 0.75 to 4 hours, preferably 1 to 3 hours, at a temperature which is above the normal boiling point of the solvent under atmospheric pressure but is not higher than about 80° C.

Low boiling solvents and mixtures are particularly useful including esters, ethers, hydrocarbons and halogenated hydrocarbons containing up to about seven carbon atoms. Typically useful solvents include, for example, methylene chloride, dichloroethylene, chloroform, ethyl acetate, trichloro-trifluoroethane, diisopropyl ether, petroleum ether and hexane. Methylene chloride at an extraction temperature of from about 50° to 80° C., and dichloroethylene at an extraction temperature of from about 65° to 80° C. are particularly preferred because they are economically practical and give very good results.

With light solvents such as ethyl acetate it is preferred to agitate the mixture during extraction. This is not necessary with halogenated hydrocarbons.

Optimum results are obtained when the weight ratio of solvent to raw coffee bean is from about 2:1, to 6:1.

After drawing off the extraction solvent the beans are preferably steamed, primarily to remove residual organic solvent, with saturated water vapor for from about 1 to 5 hours at a pressure from about 4.3 psia to 42.7 psig. The moist beans can then be dried at elevated temperature, preferably about 80° to 110° C., to a water content of from about 8 to 13 percent by weight.

The caffeine content of the coffee beans is substantially unaltered by the process of this invention. It is believed that the reason for this is that dry, raw beans previously untreated with water or water vapor are extracted. In contrast with the results obtained by the Lendrich method, there is a clearly measurable reduction of irritants particularly surface waxes and carboxylic acid-5-hydroxy tryptamides.

The following examples are given by way of illustration only and are not to be considered limitations of this invention many apparent variations of which are possible without departing from the spirit or scope thereof.

EXAMPLE 1

Five hundred kilograms of raw coffee beans are extracted in a closed system with 2,000 kg. of methylene chloride for 2 hours at 60° C. The solvent is drawn off and saturated water vapor at 110° C. is conducted through the mixture. The beans are thereafter dried at 90° C. The dry coffee beans are after roasting not appreciably different in appearance from commercially roasted coffee beans. A sample of coffee prepared by percolation is not distinguishable from similarly prepared coffee made from commercially roasted beans.

An analysis of the residue remaining after evaporation of the organic extraction solvent reveals phenolic surface waxes and other lipophilic substances.

EXAMPLE 2

One thousand kilograms of raw coffee beans are extracted in a closed system with 3,000 kg. of 1,2-dichloroethylene with stirring for one hour at 75° C. The solvent is drawn off and the mixture treated for 3 hours at 105° C. with saturated water vapor. The beans are dried at 80° C. The results are similar to Example 1.

EXAMPLE 3

Two hundred and fifty kilograms of raw coffee beans are extracted in a closed system with 500 kg. of hexane with stirring for 0.75 hour at 80° C. The solvent is drawn off and the residue trated with saturated water vapor at 80° C. for 3 hours. The beans are subsequently dried at 80° C. with results similar to Example 1.

What is claimed is:

1. A process for the removal of wax-like materials and carboxylic acid-5-hydroxy-tryptamides from raw coffee beans without reducing the caffeine content thereof which comprises extracting the raw beans under autogenous pressure with a water immiscible, low boiling organic solvent selected from the group consisting of esters, ethers hydrocarbons and halogenated hydrocarbons containing up to about seven carbon atoms for a period of from about 0.75 to 4 hours at a temperature which is above the boiling point of the solvent under atmospheric pressure but no higher than about 80° C.

2. A process according to claim 1 wherein the solvent is methylene chloride, dichloroethylene, chloroform, trichloro-trifluoroethane, ethyl acetate, di-isopropyl ether, petroleum ether or hexane.

3. A process as in claim 1 wherein the solvent is methylene chloride and the extraction temperature is from about 50° to 80° C. and the extraction period is from 1 to 3 hours.

4. A process as in claim 1 wherein the solvent is dichloroethylene and the extraction temperature is from about 65° to 80° C. and the extraction period is from 1 to 3 hours.

5. A process as in claim 1 wherein the solvent-coffee bean weight ratio is from about 2:1 to 6:1.

6. A process as in claim 1 wherein the solvent extracted coffee beans are thereafter treated with saturated steam at about 4.3 psia to 42.7 psig for from about 1 to 5 hours.

7. A process as in claim 6 wherein the water vapor treated beans are dried at elevated temperature to a water content of from about 8 to 13 percent by weight.

8. A process as in claim 7 wherein the temperature is from about 80° to 110° C.

* * * * *